Dec. 27, 1949 D. E. BENCH 2,492,613
ALTERNATING CURRENT MOTOR AND METHOD OF OPERATION
Filed May 17, 1948 2 Sheets-Sheet 1
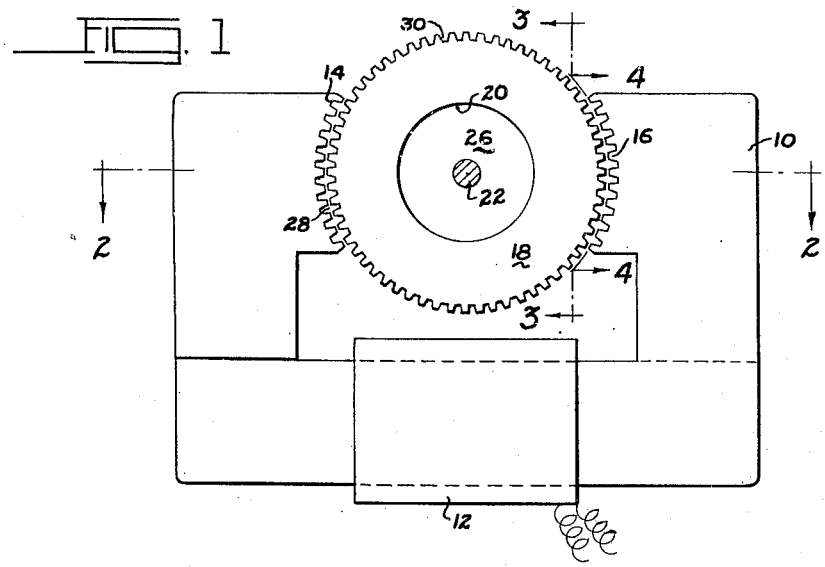
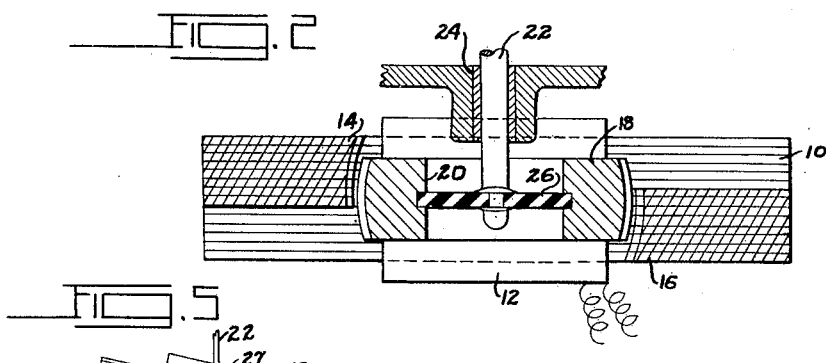
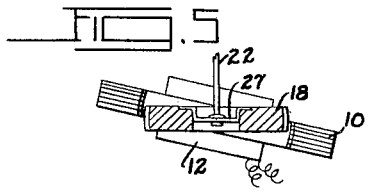
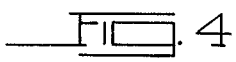
INVENTOR
DAVID E. BENCH
BY
Toulmin & Toulmin
ATTORNEYS Dec. 27, 1949     D. E. BENCH     2,492,613
ALTERNATING CURRENT MOTOR AND METHOD OF OPERATION
Filed May 17, 1948     2 Sheets-Sheet 2
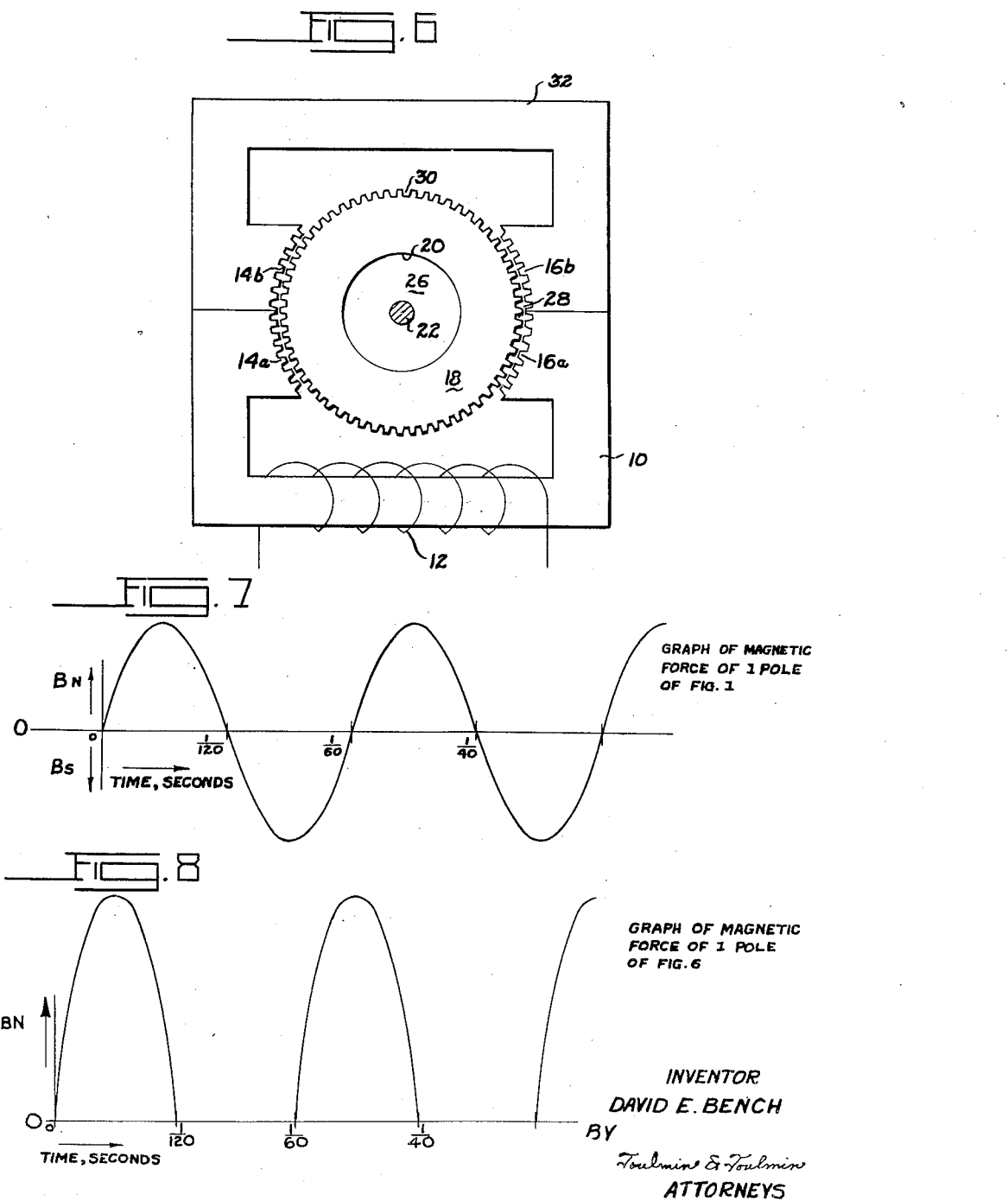

Patented Dec. 27, 1949

2,492,613

UNITED STATES PATENT OFFICE 2,492,613

ALTERNATING CURRENT MOTOR AND METHOD OF OPERATION

David E. Bench, Dayton, Ohio, assignor to Hansen Manufacturing Company, Inc., Princeton, Ind., a corporation of Indiana Application May 17, 1948, Serial No. 27,483

12 Claims. (172—278)

This invention relates to electric motors, and particularly to synchronous electric motors of the type employed in clocks, timers, and the like, and to methods of operation thereof.

The primary object of the instant invention is to provide a synchronous electric motor which is simple and inexpensive in construction and which has long life and low operating cost.

A still further object of this invention is to provide a self-starting type synchronous motor and which will always run in the same direction of rotation.

A still further object is the provision of a slow speed synchronous electric motor and which is very quiet in operation.

It is also an object to provide a new and novel method of operating an alternating current motor.

These and other objects and advantages will become more apparent upon reference to the following description taken in connection with the accompanying drawings in which:

Figure 1 is a plan view of one type of motor constructed according to my invention;

Figure 2 is a section taken through the rotor and the pole faces and as indicated by the line 2—2 on Figure 1;

Figure 3 is a view looking at one side of the rotor and indicated by the line 3—3 on Figure 1;

Figure 4 is a view looking in at the pole face adjacent the side of the rotor shown in Figure 3 and as indicated by the line 4—4 on Figure 1;

Figure 5 is a small view similar to Figure 2 but showing another manner of constructing the field;

Figure 6 is a view similar to Figure 1 but showing the combination of a permanent magnet structure in the motor field;

Figure 7 is a graph showing the variation in the magnetic field of the motor shown in Figure 1; and Figure 8 is a view similar to Figure 1 but showing the variation in the magnetic field of a motor constructed according to Figure 6.

Referring to the drawings, the motor shown in Figures 1 through 4 comprises a field part 10 which consists of a generally C-shaped magnetic frame having a coil 12 mounted thereon and terminating in the spaced pole faces 14 and 16.

The frame 10 is preferably laminated as seen in Figure 2, but it will be understood that it could be a solid magnetic member if desired. Preferably, since the coil 12 is to be energized by an alternating current, the field 10 is laminated of relatively thin magnetic steel in order to reduce eddy current and hysteresis losses therein.

As indicated in Figures 1 and 2, the magnetic frame 10 of the motor is so arranged that the pole faces 14 and 16 are axially offset. This may be accomplished as shown in Figure 2 by stacking the laminations, some of which are formed for the pole face 14 and some of which are formed for the pole face 16 in such a manner that the configuration shown results. However, as shown in Figure 5, the frame 10 could be of substantially conventional structure if so desired and the offsetting of the pole faces accomplished by tilting it relative to the rotor.

Mounted between the pole faces 14 and 16 is a rotor 18 which consists of an annular outer part which is apertured as at 20. Extending along the axis of the rotor 18 and into the aperture 20 is a supporting shaft 22 which may, in turn, be suitably supported by a bearing such as the sleeve bearing indicated at 24.

The connection between the shaft 22 and the rotor 18 is by means of a resilient disc 26 which is shown in Figure 2 as rubber, but which may be metallic, as shown at 27 in Figure 5, or of any other suitable material or construction so long as it embodies resilience to the proper degree.

As will be seen in Figure 2, the rotor is skewed in space relative to the principal magnetic axis extending between the pole faces 14 and 16. Thus, upon excitation of the frame 10 the rotor 18 will tend to twist in the plane of its supporting shaft in order more clearly to align its principal magnetic axis with the principal magnetic axis of the field structure.

It will be further apparent that if the coil 12 is energized with alternating current of, say, a commercial frequency of 50 or 60 cycles per second, and the mass of the rotor is so adjusted relative to the resilience of the member 26 that it will oscillate at this frequency, then energization of the said coil will result in vibratory motion of the rotor in the plane of its supporting shaft.

Assuming that the coil 12 is energized at 60 cycles per second, then the rotor 18 will be drawn toward alignment with the field poles 120 times each second, or 7,200 times per minute.

This phenomenon is taken advantage of in producing rotary motion of the rotor and shaft 22 for the purpose of driving a clock, timer, or the like. This is done by providing the pole faces 14 and 16 with the slots indicated at 28 and providing the periphery of the rotor with the slots indicated therein at 30.

It will be apparent from Figure 1 that these slots register and there are thus formed between the pole faces and rotor alternate bands of high and low magnetic reluctance. This causes the magnetic lines emanating from each pole face to group into a plurality of bands so that there are, in effect, a plurality of individual poles across each pole face. This phenomenon is well known in connection with the ordinary type sub-synchronous electric motor, but which electric motors are not self-starting.

Referring further to the slots 28 and 30, reference to Figures 3 and 4 will reveal that these slots extend diagonally across the periphery of the rotor 18 and the pole faces. The net result of arranging the slots in this manner is to cause the rotor to turn as it is drawn toward alignment with the field poles.

Inasmuch as the rotor will return toward or to its Figure 2 position, during the period between successive half cycles in the current coil 12 that the resilience of the member 26 overcomes the field of the motor, it will be apparent that the rotative effort exerted on the said rotor is always in one direction.

It will also be apparent that the motor is self-starting and that immediately upon energization of the coil 12 the rotor will commence to vibrate and also commence to turn. After a brief period of time the speed of rotation of the rotor will become synchronous and thereafter the motor will continue to run at synchronous speed until overloaded or de-energized.

The successive half cycles of current supplied to the coil 12 and of the resultant magnetization set up in the frame 10 and between the pole faces 14 and 16 is illustrated in Figure 7. In this figure it will be noted that on each half cycle of current the field is energized so that the rotor is pulled toward alignment with the magnetic axis of the motor field on each half cycle of current. Assuming that the rotor advances one tooth each time it moves toward alignment with the magnetic field, it will be apparent that a 60-tooth rotor, as shown in Figure 1, will revolve at the rate of two revolutions per second. This motor speed is not only easily utilized in connection with driving clocks and timers, but also insures long bearing life in the motor and quiet operation over a long period of time.

The operation of the motor may further be considered as follows:

On starting, a load is placed on the armature, namely, the moment of inertia of the armature. This causes the vertical motion of the armature to lag behind the field. Thus, the most intense field strength will occur at some mid-point in the downward traversal, whereas at some mid-point in the upward traversal the field strength will be zero. Hence, on the way down the armature will be closely coupled to the field pole most of the time and on the way up it will be loosely coupled. This will result in the rotational component of the direction of slant of the ridges, governing the direction of rotation of the rotor.

When the motor is up to speed, the phase lag will disappear unless a load is placed on the motor.

It will be evident that the rotor will not merely follow the ridges on the downstroke, going forward, and return along the same path going upward, thereby cancelling the effect. Since the downstroke is accompanied by a much stronger coupling between the armature and the field poles than is the upstroke, a greater impulse is delivered on the downstroke, the armature being virtually free to coast forward on the upstroke.

The rotor shown in Figures 1 and 2 is supported on only one side thereof by the bearing 24, but it will be obvious that bearings could be placed on each side of the rotor if so desired or to provide for more adequate support therefor.

Inasmuch as the movement of the rotor is vibratory about its connection with the shaft 22, is is preferable that the pole faces 14 and 16 and the periphery of the rotor be formed to portions of concentric spheres. By so shaping the pole faces and rotor the air gap therebetween can be maintained constant at all times and be adjusted in order to provide for the optimum operating conditions.

In Figure 6 there is illustrated a somewhat modified arrangement wherein the rotor oscillates and rotates at one-half the speed of the rotor in Figures 1 and 2. This reduction in operating speed of the rotor is accomplished by the addition to the field structure of a permanent magnet 32.

As shown, the frame 10 of the magnetic field which is energized by the coil 12 has the parts 14a and 16a of the field poles, the other parts 14b and 16b of which are parts of the permanent magnet 32. The rotor and the pole faces are otherwise constructed exactly as shown in Figures 1 and 2.

The arrangement shown in Figure 6 has the effect of rectifying the magnetic field as shown in Figure 8. In this figure it will be noted that the magnetic field varies between substantially zero and maximum strength in one direction. The zero field occurs when the poles of the permanent magnet are of opposite polarity to those of the electro-magnetic poles and at which time the two magnets shunt through each other, while maximum strength of the field occurs when the poles of the magnet are all of the same polarity and therefore set up a high magnetomotive force across the rotor. The number of impulses delivered to the rotor is thus reduced by half and its operating speed is reduced by half. That is, on 60 cycle current being supplied to the coil 12 the rotor will be acted on by the field 60 times a second and will thus move toward a position of alignment with the field 3,600 times each minute. A 60-tooth rotor as shown will, therefore, rotate at one revolution a second. For this reduced speed of operation the mass of the rotor and the resilience of the yielding support therefor are, of course, selected to give the rotor a natural vibratory period of approximately 1/60 second.

It will be understood that the permanent magnet 32 shown in Figure 6 is adapted for being associated with the magnetic frame 10 in any manner which will suitably nullify at least one-half cycle of the magnetic field set up therein. The poles of the magnet 32 could thus be overlapped or interleaved with the poles of the frame 10 or the said magnet could be arranged to shunt across the coil 12 directly and form no direct part of the pole faces.

It will be understood that the essential feature in connection with the magnet 32 is that it is selected so that the magnetic field pattern set up between the poles 14 and 16 will be substantially that illustrated in the graph of Figure 2.

It will be understood that this invention is susceptible to modification in order to adapt it to different usages and conditions and, accordingly, it is desired to comprehend such modifications within this invention as may fall within the scope of the appended claims.

I claim:
1. In an electric motor; a field structure having spaced pole faces, a rotor between said pole faces, a shaft resiliently supporting said rotor in skewed relation to said faces whereby excitation of said field will urge said rotor to turn in the plane of said shaft, and slots extending diagonally across the periphery of said rotor and said pole faces so that said aforementioned turning of said rotor is accompanied by rotation of said shaft and rotor in one direction.

2. In an electric motor having a field structure with a pair of spaced pole faces and a rotor therebetween; a shaft for supporting said rotor in skewed relation to said pole faces, resilient means connecting said shaft with said rotor, and slots extending diagonally across the periphery of said pole faces so that excitation of said field will result in a vibratory motion of said rotor about its connection with said shaft and bodily rotation of said shaft and rotor as a unit.

3. In an electric motor; a field structure having spaced pole faces, means for exciting said field with an alternating magnetism, a rotor mounted between said pole faces and skewed relative to the magnetic axis therebetween, a shaft and a resilient element connecting said shaft with said rotor, and inclined slots in the periphery of said rotor and in said pole faces, said pole faces and the periphery of said rotor being formed as portions of concentric spheres whereby rotary and oscillating movement of said rotor do not change the air gap between said rotor and said pole faces.

4. In a synchronous electric motor; a field structure comprising a pair of poles having their faces formed to the shape of diametrically opposite points of a first sphere, a rotor having its periphery formed to the shape of a part of a second sphere concentric with said first sphere but smaller, a shaft for said rotor, means resiliently supporting said rotor on said shaft and in skewed relation to said poles whereby excitation of said field structure will cause said rotor to move in the plane of said shaft, and a plurality of ribs on said pole faces and the periphery of said rotor, said ribs extending diagonally across the periphery of said rotor and also extending diagonally across said pole faces in the same direction as the ribs on the adjacent part of said rotor, said ribs on said rotor and said poles having the same angular spacing relative to the center of said spheres.

5. In a synchronous electric motor; a field structure having a pair of poles, a coil for exciting said field by an alternating current supply, a permanent magnet having its poles magnetically connected with the poles of said field structure and of a strength sufficient to nullify the effect of said coil on at least one-half cycle of energization thereof whereby a unidirectional pulsating magnetic field is established at said poles, a rotor mounted between said poles and skewed in space relative thereto, a shaft for supporting said rotor, resilient means between said shaft and rotor, and diagonal slots on the periphery of said rotor and on said pole faces.

6. In a synchronous electric motor; a field structure having a pair of poles, a coil for exciting said field by an alternating current supply, a permanent magnet having its poles magnetically connected with the poles of the field structure and forming a shunt around said coil, said magnet being of a strength substantially to nullify the effect of said coil on at least one-half cycle of energization thereof whereby a unidirectional pulsating magnetic field is established at said poles, a rotor mounted between said poles and skewed in space relative thereto, a shaft for supporting said rotor, resilient means between said shaft and rotor, and diagonal slots on the periphery of said rotor and on said pole faces, said pole faces and the periphery of said rotor being formed to parts of concentric spheres.

7. In combination; a pair of magnetic members having their principal magnetic axes intersecting, means resiliently urging said members toward a position where said axes intersect at an oblique angle, means for establishing a periodically varying magnetic field linking said members thereby to produce periodic vibratory movement of one of said members, and alternate paths of high and low reluctance on the adjacent faces of said members and extending diagonally thereacross whereby said periodic movement is accompanied by a relative movement between said members at an angle to the direction of said periodic movement.

8. In a synchronous motor, a disc rotor of magnetic material, a field structure comprising a pair of magnetic pole faces diametrically on opposite sides of said rotor, a shaft perpendicular to said rotor and means resiliently supporting the rotor on the shaft, alternate paths of high and low reluctance extending diagonally across the periphery of said rotor and said pole faces, said pole faces being offset so one is on one side of the center line of said rotor and the other is on the other side thereof, and means for establishing a pulsating magnetic field between said pole faces.

9. In an electric motor; a field structure defining an axis of magnetization, a magnetic rotor mounted so as to have its principal magnetic axis oblique to and intersected by the said axis of magnetization of said field structure, means resiliently supporting said rotor for rotation on an axis extending perpendicular to the magnetic axis of the rotor while permitting vibratory movement of the said rotor to vary the angle between its magnetic axis and the magnetic axis of said field structure, means for energizing said field structure to establish a periodically varying magnetic field along its axis of magnetization whereby said rotor vibrates, and means responsive to the vibratory movement of said rotor during magnetization of the field structure for causing said rotor to rotate on the said axis of rotation.

10. In an electric motor having a field structure defining an axis of magnetization, a rotor mounted so as to be intersected by said axis and having its principal magnetic axis at an angle to said axis of magnetization, shaft means perpendicular to said magnetic axis, means resiliently supporting said rotor thereon whereby excitation of said field will cause movement of said rotor toward a position of alignment of said axes, and means for causing rotary movement of said rotor simultaneously with its movement toward alignment with said axis.

11. In an electric motor; a field structure defining an axis of magnetization, a rotor mounted so as to be intersected by said axis and rotatable on a line at an oblique angle to said axis, said rotor having a principal magnetic axis extending therethrough at an angle to said axis of magnetization, shaft means perpendicular to said magnetic axis, and means resiliently supporting said rotor thereon whereby said rotor can move toward a position of alignment of said axes upon excitation of said field, and means defining inclined pole faces on said rotor and field so that the aforementioned movement of said rotor is accompanied by a rotary movement.

12. In combination; a field structure having a pole and a coil adapted for being connected with an alternating current supply to excite said pole, a vibratory magnetic member resiliently mounted adjacent said pole, the magnetic axis of said member being at an angle to the magnetic axis of said pole whereby said member is acted on by the field of the pole to vibrate in unison with the pulsations thereof, and diagonal slots in the face of said pole and on the edge of said member whereby the vibratory action of said member is accompanied by movement thereof transverse to the direction of said vibratory movement.

DAVID E. BENCH.

REFERENCES CITED

The following references are of record in the file of this patent:

UNITED STATES PATENTS

| Number | Name | Date |
| --- | --- | --- |
| 1,862,356 | Warren | June 7, 1932 |
| 2,081,411 | Stoller et al. | May 25, 1937 |

FOREIGN PATENTS

| Number | Country | Date |
| --- | --- | --- |
| 407,800 | Great Britain | Mar. 29, 1934 |
| 428,885 | Great Britain | May 21, 1935 |